United States Patent [19]
Patti et al.

[11] Patent Number: 5,602,654
[45] Date of Patent: Feb. 11, 1997

[54] CONTOUR-SENSITIVE, SINGLE-FIELD DEINTERLACING METHOD

[75] Inventors: Andrew J. Patti; Jonathan K. Riek; M. Ibrahim Sezan, all of Rochester, N.Y.

[73] Assignee: National Science Council, Taipei, Taiwan

[21] Appl. No.: 369,847

[22] Filed: Jan. 6, 1995

[51] Int. Cl.$^6$ .............................. H04N 1/40; H04N 7/01; G06K 9/40

[52] U.S. Cl. ..................... 358/461; 358/428; 348/448; 382/266

[58] Field of Search ................................. 358/461, 448, 358/428, 431, 433, 447; 348/448, 450, 451, 449, 452; 382/254, 266, 273, 268; H04N 1/40

[56] References Cited

U.S. PATENT DOCUMENTS

| | | | |
|---|---|---|---|
| 4,472,732 | 9/1984 | Bennett et al. | 358/22 |
| 5,019,903 | 5/1991 | Dougall et al. | 358/140 |
| 5,303,060 | 4/1994 | Iwamura | 358/310 |
| 5,305,112 | 4/1994 | Yamamoto et al. | 358/310 |
| 5,382,976 | 1/1995 | Hibbard | 348/273 |
| 5,473,383 | 12/1995 | Sezan et al. | 348/452 |

*Primary Examiner*—Edward L. Coles, Sr.
*Assistant Examiner*—Madeleine Anh-Vinh Nguyen
*Attorney, Agent, or Firm*—Madson & Metcalf

[57] ABSTRACT

The present invention is a two-step, contour-sensitive deinterlacing technique. The first step of the technique determines for each missing pixel of an interlaced frame of image pixels whether the absolute difference between the pixels above and below the missing pixel is greater than a preselected threshold value. If it is decided that the missing pixel lies at a low-vertical frequency location, its value is estimated via vertical interpolation. Otherwise, the second step is carried out. The goal of the second step is to determine whether or not there is a well-defined contour passing through the missing pixel, and to determine its direction if there is one. In the presence of a well-defined contour, the missing pixel is obtained by averaging the intensity values along the direction of the contour in the field lines immediately above and below the missing field line. Otherwise the process effectively falls back to vertical interpolation. The presence of a well-defined contour is detected by comparing the summed absolute differences (SAD) of blocks of pixels along a predetermined set of candidate directions, including the vertical direction, and selecting the direction associated with the least SAD. The fall-back to vertical interpolation in the absence of a well-defined contour is implicit due to the weighting of the SAD corresponding to the vertical direction.

10 Claims, 5 Drawing Sheets

FIG. 1
(PRIOR ART)

|  e1 |  e2 |  e3 |  e4 |  e5 |  e6 |  e7 |  e8 |
|-----|-----|-----|-----|-----|-----|-----|-----|
|  x1 |  x2 |  x3 |  x4 |  x5 |  x6 |  x7 |  x8 |
|  e9 | e10 | e11 | e12 | e13 | e14 | e15 | e16 |
|  x9 | x10 | x11 | x12 | x13 | x14 | x15 | x16 |
| e17 | e18 | e19 | e20 | e21 | e22 | e23 | e24 |
| x17 | x18 | x19 | x20 | x21 | x22 | x23 | x24 |

FIG. 2A (PRIOR ART)

|  x1 |  x2 |  x3 |  x4 |  x5 |  x6 |  x7 |  x8 |
|-----|-----|-----|-----|-----|-----|-----|-----|
|  o1 |  o2 |  o3 |  o4 |  o5 |  o6 |  o7 |  o8 |
|  x9 | x10 | x11 | x12 | x13 | x14 | x15 | x16 |
|  o9 | o10 | o11 | o12 | o13 | o14 | o15 | o16 |
| x17 | x18 | x19 | x20 | x21 | x22 | x23 | x24 |
| o17 | o18 | o19 | o20 | o21 | o22 | o23 | o24 |

CONTOUR-SENSITIVE, SINGLE-FIELD DEINTERLACING METHOD

FIELD OF THE INVENTION

The present invention is related to the field of digital image processing and more specifically to a technique for obtaining a progressively scanned frame from a single field of an interlaced video signal, i.e., deinterlacing, using contour-sensitive spatial interpolation.

BACKGROUND OF THE INVENTION

A portion of the disclosure of this document contains material to which a claim of copyright protection is made. The copyright owner has no objection to the facsimile reproduction of any one of the patent documents, as it appears in the U.S. Patent and Trademark Office patent file or records, but reserves all other rights whatsoever.

Deinterlacing enables the display of an interlaced video signal on a progressive display to obtain high visual quality. Deinterlacing facilitates interoperability among interlaced and progressive systems. In addition, deinterlacing prior to printing, may result in higher quality still pictures from video. The performance requirements of a deinterlacing algorithm are relatively higher when the algorithm is used in creating stills from video as opposed to creating a progressive video signal for display at video rates. Artifacts that may be generated during deinterlacing are much more objectionable when the deinterlaced frame is viewed as a still image. One of the goals of this invention is to develop a computationally efficient deinterlacing algorithm that satisfies the quality requirements of stills from interlaced video.

Figure 1:
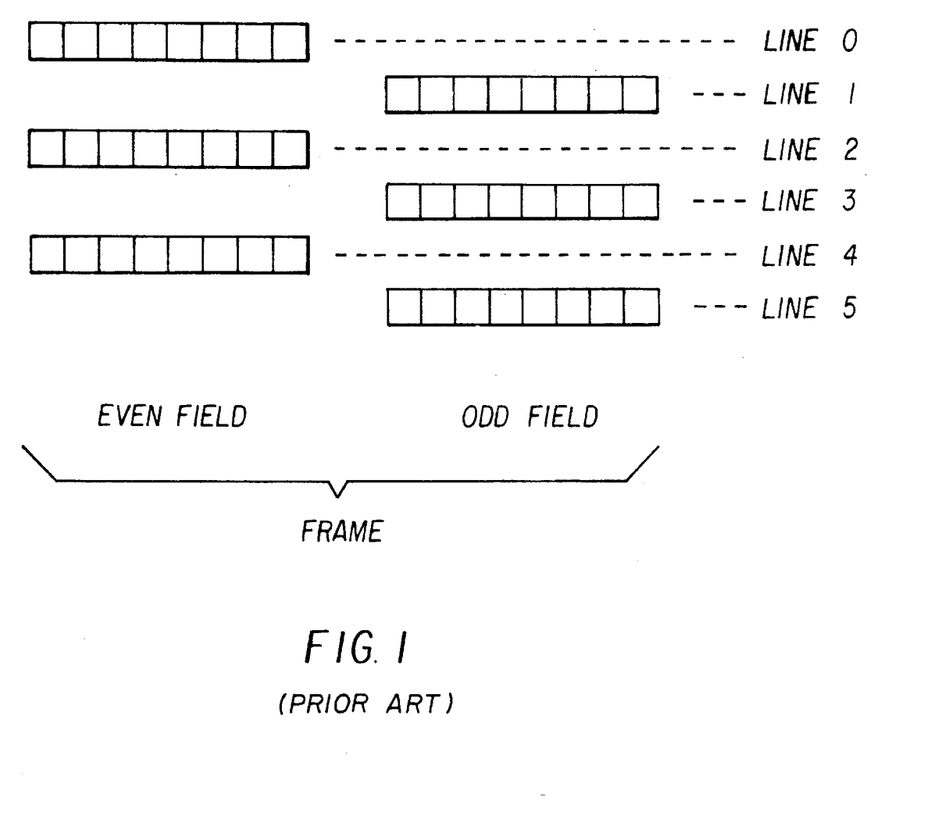
FIG. 1 depicts the fields in an interlaced frame of video.

Referring to FIG. 1, in interlaced video each frame is composed of two fields, i.e., even and odd fields. Compared to the size of a full frame, each field is subsampled by a factor of 2 in the vertical dimension. The even field contains data at even-numbered line locations, and the odd field contains data at odd-numbered line locations. The two fields are acquired at different instances of time.

Figure 2A:
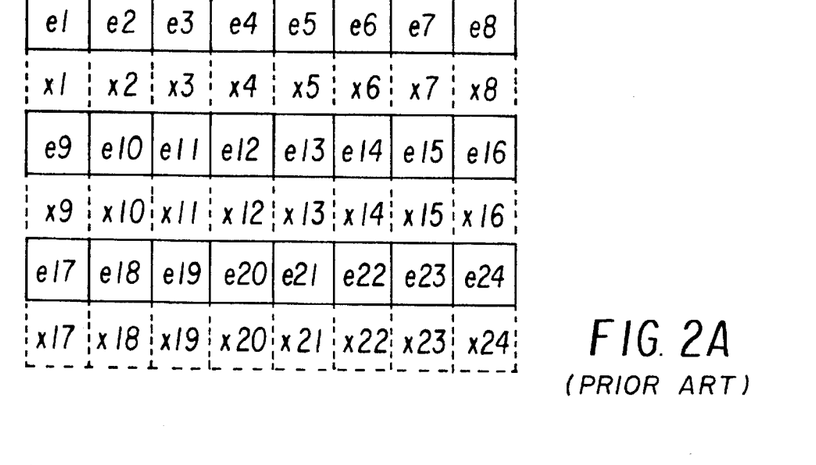
FIG. 2a illustrates, in chart form, the odd field to be interpolated. The missing pixel values are denoted as "xj", where j=1–24.
Figure 2B:
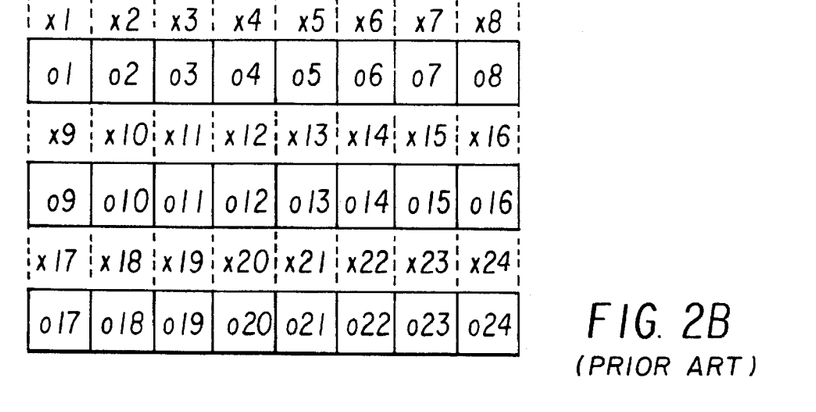
FIG. 2b illustrates, in chart form, the even field to be interpolated. The missing pixel values are denoted as "xj", where j=1–24.

The problem of deinterlacing an even (or an odd) field generally requires an estimation of the missing odd (or even) lines, as shown in FIGS. 2a and 2b. With the estimated lines being displayed as dotted boxes a well-known, simple method of estimation is to merge the even and odd fields, i.e., to fill in the missing lines of the odd (even) field by the lines of the neighboring even (odd) field. This simple method causes spatial (stat) artifacts at those image regions that contain moving objects (objects that move within the time interval of two successive fields). Another approach to deinterlacing is to concentrate on a single field only (i.e., the odd field) and interpolate the missing lines using spatial interpolation. A simple spatial interpolation technique is vertical linear interpolation where the missing pixel is assigned the average of the available pixel values above and below the missing pixel. This method provides satisfactory results when the missing pixel is located in a low-vertical frequency region, but may cause artifacts otherwise, especially if the missing pixel is over an image contour (edge) whose orientation is not vertical.

To overcome these artifacts, a contour-direction sensitive (henceforth contour-sensitive) spatial interpolation method is proposed by M. A. Isnardi in "Modeling The Television Process", Technical Report No. 515, Massachusetts Institute of Technology, Research Laboratory of Electronics, May, 1986, and in U.S. Pat. No. 5,019,903. These methods attempt to find the orientation of the contour passing through the missing pixel. Interpolation is then performed using image values along this orientation in order not to "cross an edge contour" and cause artifacts. The orientation is determined on the basis of intensity differences among pixels that are horizontally and vertically offset from the missing pixel in a symmetrical manner. For instance, in FIG. 2a, in determining the value of x12, one may consider the vertical and the 45 degrees directions by comparing |e12−e20| with |e13−e19|. The lesser of these two absolute differences indicates the direction of the contour passing through x12. One can also consider the difference of blocks of pixels by comparing, for instance (|e11−e19|+|e12−e20|+|e13−e21|) with (|e12−e20|+|e13−e19|+|e14−e18|), where blocks are of size 1×3 pixels.

Figure 3:
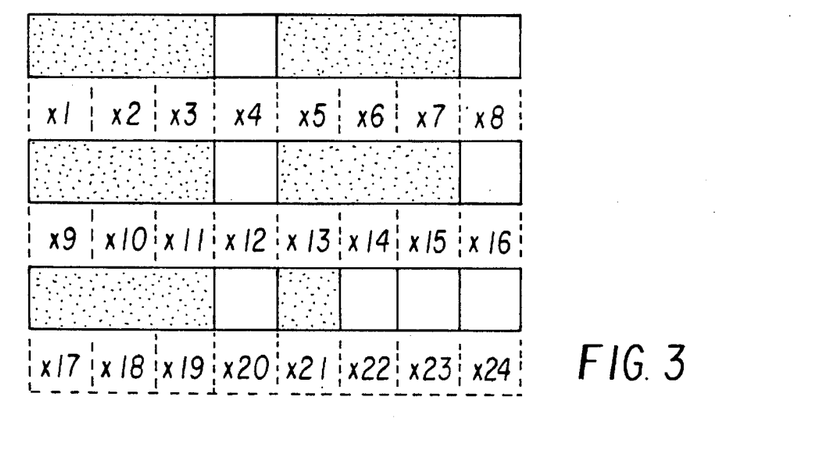
FIG. 3 illustrates, in chart form, an arrangement of the letters B and F which may cause artifacts with prior art directional interpolation methods.

There are, however, two major draw backs with such techniques. First, those techniques go through the process of estimating an orientation for the contour that is possibly passing through the missing pixel before checking to see if there is an actual contour. The consequence is increased computation time, since in the absence of a contour (or when the missing pixel is located at a low-vertical frequency region) vertical interpolation provides a satisfactory estimate in a computationally effective manner. Furthermore, estimating the direction of a contour in the absence of an actual, well-defined contour introduces artifacts since the estimated direction becomes meaningless. These artifacts are often created in regions of the scene containing small high-frequency details (i.e., text against a uniform background), as illustrated in FIG. 3, where the even lines of an example region containing the letters "BF" are depicted. To be noted, pixels x1, x3, x9, x11, and x13 should be rendered black to represent the letters B and F correctly. Also note that for pixel x12, for instance, there is no connected contour passing through it. The choice of the direction becomes random, for all practical purposes. For instance, it is quite possible that an erroneous direction for x12 (i.e., +45 degrees) resulting in an erroneous estimate that is obtained by averaging e13 and e19 (FIG. 2a). The present invention overcomes these problems by not performing directional interpolation unless the missing pixel is located at a high-vertical frequency region, and unless there is a well-defined connected contour passing through the missing pixel.

SUMMARY OF THE INVENTION

In the preferred method embodiment of the invention there is provided: A contour-sensitive deinterlacing method for interpolating between lines of pixels representing a field of digital video to produce an interpolated field of digital video comprising the steps of:

a) establishing a threshold value based on a minimum visually detectable intensity variation in the original pixel values;

b) determining the absolute difference between original pixel values above and below a missing pixel value;

c) determining if the absolute difference value is greater than the established threshold value;

d) applying the average value of the above and below pixels as the missing pixel value if the absolute difference value is less than the threshold value;

e) if the absolute difference value is greater than the threshold value then performing the steps of:

f) determining, for said missing pixel the extent of matching between two blocks of M1×M2 pixels of said field of digital video (where M1 is the number of lines and M2 is the number of pixels), said two blocks being vertically offset from one another in opposite directions, and being horizontally offset from one another in opposite directions, with respect to the missing pixel position, said step of determining being carried out for a plurality of different horizontal offsets, including zero offset and at least one offset on each side of zero, so as to produce a respective value of the extent of matching for each of said horizontal offsets;

g) determining the horizontal offset which provides the greatest extent of matching;

h) interpolating the missing pixel value in the direction corresponding to said determined horizontal offset; and i) repeating steps b–h for each of the missing pixels in the field of digital video to form an interpolated field of digital video.

In the system embodiment of the invention there is provided: A contour-sensitive deinterlacing system representing a field of digital video to produce an interpolated field of digital video comprising:

means for horizontally interpolating between the pixels in each of said lines of said field of digital video to produce interpolated pixels located between adjacent pairs of original pixels;

means for establishing a threshold value based on a minimum visually detectable intensity variation in the original pixel values;

means for determining the absolute difference between original pixel values above and below a missing pixel value;

means for determining if the absolute difference value is greater than the established threshold value;

means for applying the average value of the above and below pixels as the missing pixel value if the absolute difference value is less than the threshold value;

means responsive to the absolute difference value being not less than the threshold value for determining, for said missing pixel the extent of matching between two blocks of M1×M2 pixels of said horizontally interpolated pixels (where M1 is the number of lines and M2 is the number of pixels), said two blocks being vertically offset from one another in opposite directions, and being horizontally offset from one another in opposite directions, with respect to the missing pixel position, said step of determining being carried out for a plurality of different horizontal offsets, including zero offset and at least one offset on each side of zero, so as to produce a respective value of the extent of matching for each of said horizontal offsets;

means for determining the horizontal offset which provides the greatest extent of matching;

means for interpolating the missing pixel value in the direction corresponding to said determined horizontal offset; and means for forming an interpolated digital video field from the interpolated pixel values.

The present invention is a two-tiered, contour-sensitive deinterlacing technique. The first step of the technique is to determine whether or not the missing pixel lies in a low-vertical spatial frequency region. This is done by thresholding the absolute difference of the available pixels located immediately above and below the missing pixel. If the absolute difference is less than the threshold, it is decided that the missing pixel lies at a low-vertical frequency location and its value is estimated via vertical interpolation, i.e., averaging of pixel values immediately above and below the missing pixel. Otherwise, it is decided that there may be a contour passing through the missing pixel, and the second step is carried out. The goal of the second step is to determine whether or not there is a well-defined contour passing through the missing pixel, and to determine its direction if there is one. In other words, the second step determines whether or not the difference that has exceeded the threshold in the first step is indicative of a well-defined contour. In the presence of a well-defined contour, the missing pixel is obtained by averaging the intensity values along the direction of the contour in the field lines immediately above and below the missing field line. If in this second step, the presence of a well-defined contour cannot be confirmed, the process effectively falls back to vertical interpolation. The presence of a well-defined contour is detected by comparing the summed absolute differences (SAD) of blocks of pixels along a predetermined set of candidate directions, including the vertical direction, and selecting the direction associated with the least SAD. The fall-back to vertical interpolation in the absence of a well-defined contour is implicit due to the weighting of the SAD corresponding to the vertical direction, as will be described below.

The effect of the first step is to speed up the entire deinterlacing process since the relatively more compute-intensive second step does not have to be carried out for a particular missing pixel if vertical averaging is expected to provide sufficiently good performance.

Furthermore, errors and consequent image artifacts resulting from estimation of a contour direction in the absence of an actual, well-defined contour is avoided. In the case of color video signals, the present invention can be separately applied to all three channels if a Red, Green, and Blue (RGB) representation is used, or to the luminance and the two associated chrominance channels when a luminance-chrominance representation is used. In the latter case, vertical interpolation can be directly applied to the chroma channels, without going through the entire steps of the invention, to further increase the computational efficiency of the deinterlacing process.

It is a primary object of the present invention to create a high quality still image from an interlaced frame of video.

Another object of the present invention is to provide a computationally efficient deinterlacing technique.

Still another object of the present invention is to provide a deinterlacing technique that eliminates the requirement for user intervention.

The above and other objects of the present invention will become more apparent when taken in conjunction with the following description and drawings wherein like characters indicate like parts and which drawings form a part of the present invention.

DETAILED DESCRIPTION OF THE INVENTION

Figure 4:
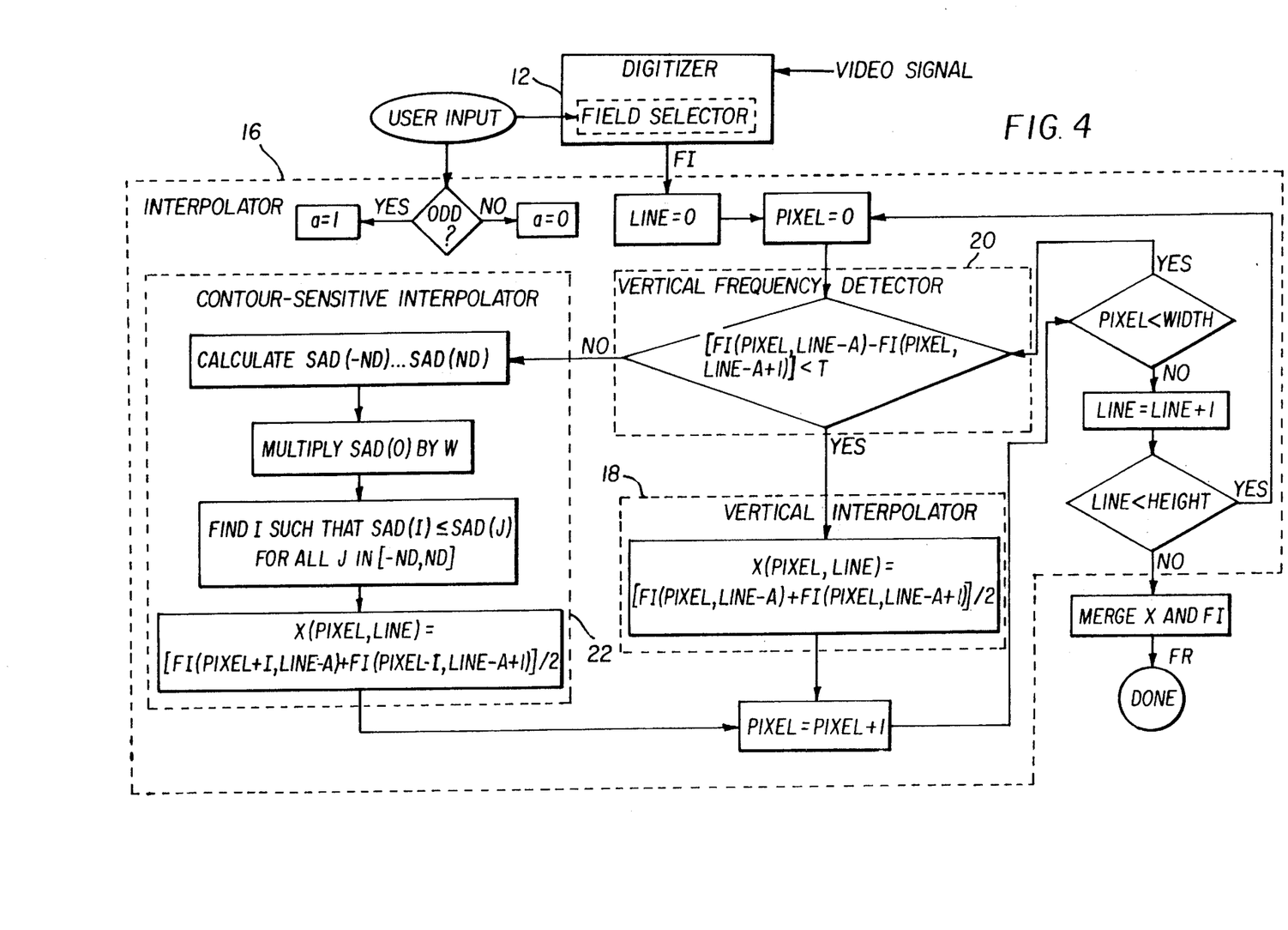
FIG. 4 illustrates, in flow diagram form the preferred method for implementing the invention.

Referring to FIG. 4, a video signal, in analog form, is inputted to a video digitizer 12. The digitizer 12 functions to digitize a single video frame, i.e., two successive fields of the video signal. Next, a user specifies a field (even or odd), denoted FI, that will be used in producing a deinterlaced frame FR, i.e., an interpolated field, denoted X, that is merged with the user selected field FI. In a variant of the invention an automatic selection of either the even or the odd field is implemented. In the preferred arrangement of the invention the frame of video has twice as many lines as the field. That is, assuming that FI is of size N1 lines by N2 pixels, the size of FR is 2N1 lines by N2 pixels. The selected field FI is then inputted to the interpolator 16. Within the interpolator 16 a vertical frequency detector 20 thresholds the absolute difference of pixel values that are immediately above and below each missing pixel. In reference to FIG. 2a one of the missing pixels is identified as x3, with the pixel above being e3, and the one below being e11. To determine whether or not x3 has high vertical frequency content, the absolute difference |e3−e11| is compared to a threshold denoted as T. The threshold, T, is based on minimum visually detectable intensity variation and its recommended value is T=8. It should be noted that the above thresholding cannot be applied to the last line if the even field is missing nor to the first line if the odd field is missing, since the missing field line only has one neighboring field line.

Based on the result of thresholding if it is decided that there is high-vertical frequency content, i.e., the absolute difference is not less than the threshold T, the missing pixel is interpolated using the contour-sensitive interpolator 22. Otherwise the missing pixel is interpolated using the vertical interpolator 18.

The vertical interpolator 18 calculates the missing pixel by averaging the pixels above and below the missing pixel. For example, for a pixel location x3, shown in FIG. 2a:

$$x3 = \tfrac{1}{2}[e3 + e11].$$

Vertical interpolation is carried out in exactly the same manner if the odd field is chosen to be deinterlaced instead of the even field. The first missing line of an even field and the last missing line of an odd field are determined by repeating the contents of the available line, below or above, respectively. For instance, in FIG. 2a, xj=ej (for j=17, 18, . . . , 24) and xj=oj (for j=1, 2, . . . , 8) in FIG. 2b.

As stated before, the purpose of performing vertical-frequency content detection is two-fold. First, it speeds up the entire deinterlacing process since the relatively more compute-intensive process of contour-sensitive interpolation does not have to be carried out for a particular missing pixel if vertical averaging is expected to provide sufficiently good performance. Second, artifacts caused by estimating a contour direction in the absence of an actual, well-defined contour passing through the missing pixel are avoided.

If a high vertical frequency has been detected by the vertical frequency detector 20 then a well-defined contour may be passing through the corresponding missing pixel. The process that will be explained in the following, implicitly determines if there is indeed a well-defined contour, and if there is, it performs averaging along that contour, otherwise it effectively performs vertical interpolation.

Figure 5:
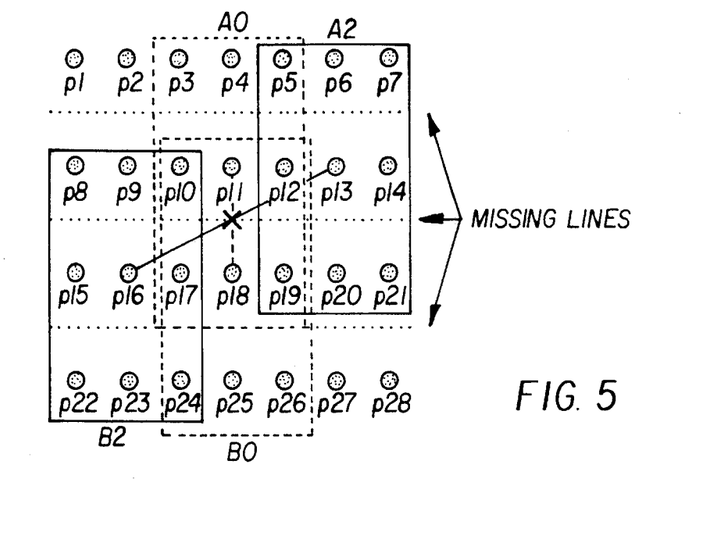
FIG. 5 illustrates blocks of pixels used to compute SAD values for two possible directions.

The contour-sensitive interpolator 22 first computes the summed absolute differences (SAD) of blocks of pixels along a predetermined range of directions. The blocks of size M1 lines by M2 pixels are centered on pixels that are on the field lines (one line of pixels in the field FI) that are immediately above and below the missing line containing the missing pixel. The centers are vertically offset from each other by one field line, as shown in FIG. 5, for the case of blocks A0, A2, B0, and B2, where M1=M2=3. The horizontal offset between the centers of the blocks determines the direction (slope) that is being considered. The blocks are offset symmetrically in the horizontal direction, about the missing pixel location, denoted as a cross in FIG. 5. Blocks that are used in evaluating two directions (vertical and approximately 30 degrees) are shown. The SADs are computed for blocks A0 and B0, and for blocks A2 and B2, to evaluate the two directions. The range of directions, also defined as a set of candidate directions, that will be considered are represented by a single parameter, ND. Given ND, directions that are horizontally offset from the vertical direction by −ND, (−ND+1), . . . , 0, . . . (ND−1), ND pixels, a total of 2ND+1 directions, are considered. For the pixel arrangement of FIG. 5, ND=2, and thus the candidate directions can be represented by straight lines going through (p9,p20), (p10,p19), (p11,p18), (p12,p17), (p13,p16). The SAD associated with the direction corresponding to the line passing through (p13,p16) is given by SAD(2)=|A2 − B2|= (|p5-p8|+|p6-p9|+|p7-p10|+|p12-p15|+|p13-p16|+|p14-p17|+ |p19-p22|+|p20-p23|+|p21-p24|), and the SAD associated with the vertical direction is given by SAD(O)=|A0− B0|= (|p3-p10|+|p4-p11|+|p5-p12|+|p10-p17|+|p11-p18|+|p12- p19|+|p17-p24|+|p18-p25|+|p19-p26|. The other SADs, namely SAD(−2), SAD(−1), and SAD(1), can be computed in a similar fashion.

Once all SADs are computed, SAD (0) is B multiplied by a weight, w, whose value is smaller than unity. Next, the minimum of the set [SAD(−ND), SAD (−ND+1) . . . , w, SAD (0), . . . SAD (ND−1), SAD(ND)] is determined by finding I, which corresponds to the optimum direction, such that SAD(I) is less than or equal to SAD(J), where J represents any of the other possible directions. To interpolate the missing pixel, averaging is applied to the two pixel values along the direction I. For instance, in FIG. 5, if SAD(2) is the minimum among the set of other SADs, then the missing pixel represented by the cross is estimated by x=(p13+p16)/2.

Figure 6:
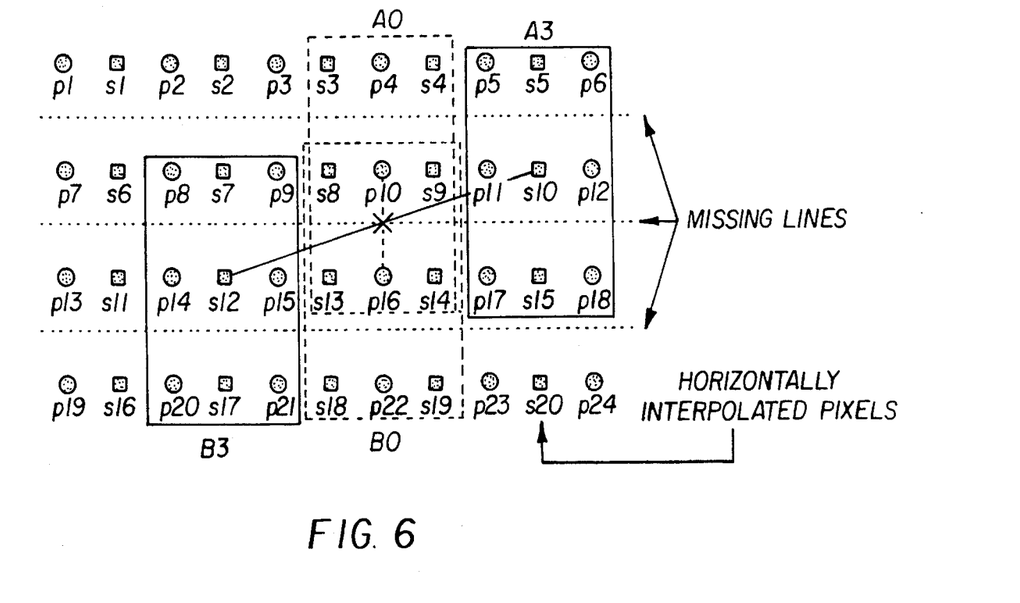
FIG. 6 illustrates blocks of pixels used to compute SAD values at a finer range of possible directions.

Candidate directions with a finer density can be considered by spatially interpolating between available pixels, using linear horizontal interpolation. The field FI can be horizontally interpolated prior to vertical frequency detection. Alternatively, horizontal interpolation can be applied on a need basis for missing pixels that are to be interpolated using contour-sensitive interpolation. In FIG. 6, pixels denoted by sj, where j=1–20, lie halfway between the existing pixels, pj's, where j=1–24. For instance, if ND=2, directions described by lines passing through (p8,p18), (s7,s15), (p9,p17), (s8,s14), (p10,p16), (s9,s13), (p11,p15), (s10,s12), (p12,p14) are considered. Those directions correspond to those offset by −ND, (−ND+k),(−ND+2k), . . . , 0, . . . , (ND−2k), (ND−k), ND from the vertical direction, where k=½. In general k=1/L, where L is the horizontal interpolation factor and ND and L determine the total number of directions (ND×L). The parameters ND and L determine the quality and the computational efficiency of the process. For larger values of ND and L more accurate directions are obtained, but also more directions must be searched adding to the total computational time. In FIG. 6, SAD(3)=|A3− B3|=(|p5− p8|+|s5-s7|+|p6− p9|+|p11− p14|+|s10− s12|+|p12-p15|+|p17-p20|+|s15-s17|+|p18-p21|). The other SADs are computed in a similar fashion. Then SAD(O) is weighted by w before a minimum value and the corresponding contour direction is selected.

The recommended value of w is 0.8, without loss of generality. The value w can be set to another value in order to meet the requirements of a particular class of scenes and video imagers. The purpose of weighting the SAD(O) is an attempt to perform directional averaging only when a well-defined contour passes through the missing pixel. If a well-defined contour cannot be determined with sufficient certainty, the process falls back to vertical interpolation. In other words, a contour direction should be accurate enough to yield the least SAD in spite of already favored SAD(O). The weight factor w implicitly realizes this very strategy. This method has produced far superior results in a far more computationally efficient manner compared to the existing art of directional interpolation for the case of a large number of video images.

It should be obvious that for missing pixels located at right, left, top, and bottom boundary regions of the missing field, certain directions cannot be considered since the SAD computation may require blocks of pixels that are not entirely within the field FI—vertical interpolation is used for such missing pixels.

Figure 7:
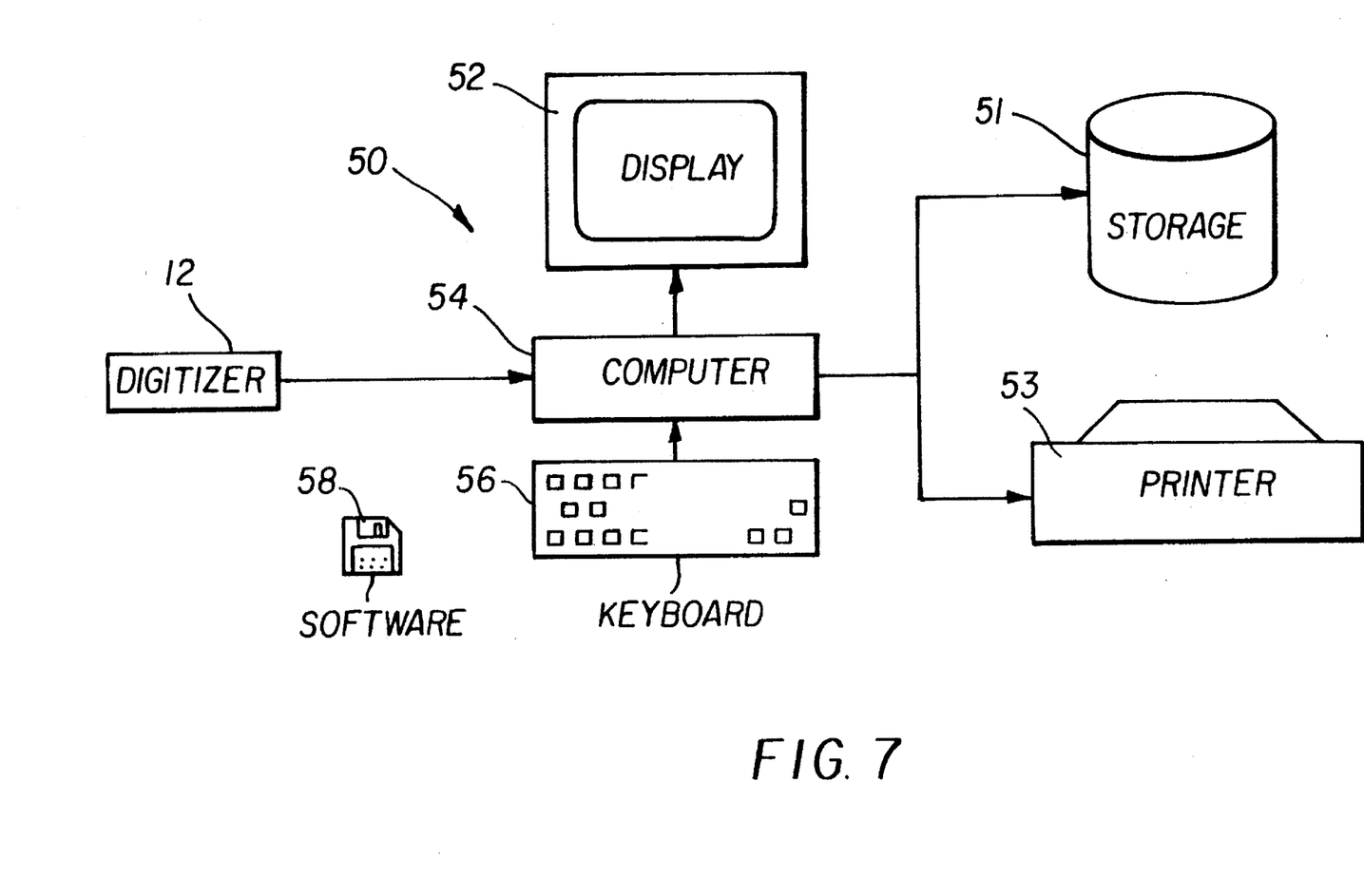
FIG. 7 illustrates, an apparatus on which the method of FIG. 4 is implemented.

FIG. 7 illustrates a digital image processing system 50 on which the process of the present invention can be implemented. The digitizer 12 provides the user selected field FI directly to the computer 54 in response to the user inputting, via the keyboard 56, the desired selection of either the even or the odd field. Interpolation of the missing field X is performed in software that is loaded into the computer 54, via the software storage disc 58. The resulting frame FR is formed, in software, by merging FI and X. The resultant can be stored in the computer's hard drive or in an external storage device 51. If immediate print out is desired it may be accomplished by the printer 53. The display 52 provides the user with an image of the finished frame FR.

Appendices A, B, and C, represent a program listing in C++ for performing the method of the present invention on a UNIX based computer.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

Parts List:
- 12- Digitizer
- 16- Interpolator
- 18- Vertical interpolator
- 20- Vertical frequency detector
- 22- Contour-sensitive interpolator
- 50- Digital image processing system
- 51- External storage device
- 52- Display
- 54- Computer
- 56- Keyboard
- 58- Software storage disc

We claim:

1. A contour-sensitive deinterlacing method for interpolating between lines of pixels representing a field of digital video to produce an interpolated field of digital video comprising the steps of:

b) determining the absolute difference between original pixel values above and below a missing pixel value, all of which the original pixel values and missing pixel value are in the same frame;

c) determining if the absolute difference is greater than an established threshold value based on a minimum visually detectable intensity variation in the original pixel values for determining if the absolute difference corresponds to an edge;

d) applying the average value of the above and below pixels as the missing pixel value if the absolute difference is less than the threshold;

e) if the absolute difference is greater than the threshold value then performing the steps of:

f) determining, for said missing pixel the extent of matching between two blocks of M1×M2 pixels of said field of digital video (where M1 is the number of lines and M2 is the number of pixels), said blocks being vertically offset from one another in opposite directions, and being horizontally offset from one another in opposite directions, with respect to the missing pixel position, said step of determining being carried out for a plurality of different horizontal offsets, including zero offset from the missing pixel's horizontal position and at least one fractional offset on each side of the missing pixel's horizontal position, so as to produce a respective value of the extent of matching for each of said horizontal offsets, where a fractional offset refers to a horizontal position that is between two existing pixel locations in a line of the field of digital video;

g) determining the horizontal offset which provides the greatest extent of matching;

h) interpolating the missing pixel value in the direction corresponding to said determined horizontal offset; and i) repeating steps b–h for each of the missing pixels in the field of digital video to form an interpolated field of digital video.

2. The method according to claim 1 wherein the intensity variation is based on variations along a vertical direction of a video field.

3. The method according to claim 1 wherein the extent of matching in the vertical direction is weighted by a factor w.

4. A contour-sensitive deinterlacing method for interpolating between lines of pixels representing a field of digital video to produce an interpolated field of digital video comprising the steps of:

a) horizontally interpolating between the pixels in each of said lines of said field of digital video to produce interpolated pixels located between adjacent pairs of original pixels;

c) determining the absolute difference between original pixel values above and below a missing pixel value, all of which said original pixel values and missing pixel value are in the same frame;

d) determining if the absolute difference value is greater than an established threshold value based on a minimum visually detectable intensity variation in the original pixel values for detecting if the absolute difference corresponds to an edge;

e) applying the average value of the above and below pixels as the missing pixel value if the absolute difference is less than the threshold value;

f) if the absolute difference value is greater than the threshold value then performing the steps of:

g) determining, for said missing pixel the extent of matching between two blocks of M1×M2 pixels of said horizontally interpolated pixels (where M1 is the number of lines and M2 is the number of pixels), said two blocks being vertically offset from one another in opposite directions, and being horizontally offset from one another in opposite directions, with respect to the missing pixel position, said step of determining being carried out for a plurality of different horizontal offsets, including zero offset from the missing pixel's horizontal position and at least one fractional offset on each side of the missing pixel's horizontal position, so as to produce a respective value of the extent of matching for each of said horizontal offsets, where the fractional offset refers to a horizontal position that is between two existing pixel locations in a line of the field of digital video;

h) determining the horizontal offset which provides the greatest extent of matching;

i) interpolating the missing pixel value in the direction corresponding to said determined horizontal offset; and j) repeating steps c–i for each of the missing pixels in the field of digital video to form an interpolated field of digital video.

5. The method according to claim 4 wherein the intensity variation is based on variations along a vertical direction of a video field.

6. The method according to claim 4 wherein the extent of matching in the vertical direction is weighted by a factor w.

7. A contour-sensitive deinterlacing system for interpolating between lines of pixels representing a field of digital video to produce an interpolated field of digital video comprising:

means for horizontally interpolating between the pixels in each of said lines of said field of digital video to produce interpolated pixels located between adjacent pairs of original pixels;

means for establishing a threshold value based on a minimum visually detectable intensity variation in the original pixel values;

means for determining the absolute difference between original pixel values above and below a missing pixel value, all of which said original pixel values and missing pixel value are in the same frame;

means for determining if the absolute difference is greater than the established threshold value;

means for applying the average value of the above and below pixels as the missing pixel value if the absolute difference is less than the threshold value;

means responsive to the absolute difference value being not less than the threshold value for determining, for said missing pixel the extent of matching between two blocks of M1×M2 pixels of said horizontally interpolated pixels (where M1 is the number of lines and M2 is the number of pixels), said two blocks being vertically offset from one another in opposite directions, and being horizontally offset from one another in opposite directions, with respect to the missing pixel position, said step of determining being carried out for a plurality of different horizontal offsets, including zero offset from the missing pixel's horizontal position and at least one fractional offset on each side of the missing pixel's horizontal position, so as to produce a respective value of the extent of matching for each of said horizontal offsets, where a fractional offset refers to a horizontal position that is between two existing pixel locations in a line of the field of digital video;

means for determining the horizontal offset which provides the greatest extent of matching;

means for interpolating the missing pixel value in the direction corresponding to said determined horizontal offset; and means for forming an interpolated digital video field from the interpolated pixel values.

8. A contour-sensitive deinterlacing method for interpolating between lines of pixels representing a field of digital video to produce an interpolated field of digital video comprising the steps of:

b) determining the absolute difference between original pixel values above and below a missing pixel value, all of which said original pixel values and missing pixel value are in the same frame;

c) determining if the absolute difference value is greater than an established threshold value based on a minimum visually detectable intensity variation in the original pixel values for determining if the absolute difference corresponds to an edge;

d) applying the average value of the above and below pixels as the missing pixel value if the absolute difference value is less than the threshold value;

e) if the absolute difference value is greater than the threshold value then performing the steps of:

f) determining, for said missing pixel the extent of matching between two blocks consisting of M1×M2 pixels of said field of digital video and/or pixels horizontally interpolated between pixels of said field of digital video (where M1 is the number of lines and M2 is the number of pixels), said two blocks being vertically offset from one another in opposite directions, and being horizontally offset from one another in opposite directions, with respect to the missing pixel position, said step of determining being carried out for a plurality of different horizontal offsets, including zero offset from the missing pixel's horizontal position and at least one fractional pixel offset on each side of the missing pixel's horizontal position, so as to produce a respective value of the extent of matching for each of said horizontal offsets, where the fractional offset refers to a horizontal position that is between two existing pixel locations in a line of the field of digital video;

g) determining the horizontal offset which provides the greatest extent of matching;

h) interpolating the missing pixel value in the direction corresponding to said determined horizontal offset; and i) repeating steps b–h for each of the missing pixels in the field of digital video to form an interpolated field of digital video.

9. The method according to claim 8 wherein the intensity variation is based on variations along a vertical direction of a video field.

10. The method according to claim 8 wherein the extent of matching in the vertical direction is weighted by a factor w.

* * * * *

UNITED STATES PATENT AND TRADEMARK OFFICE
CERTIFICATE OF CORRECTION

PATENT NO. : 5,602,654
DATED : February 11, 1997
INVENTOR(S) : Andrew J. Patti, et al It is certified that error appears in the above-indentified patent and that said Letters Patent is hereby corrected as shown below:

ON THE TITLE PAGE:

Item [73] Assignee: Should be corrected from "National Science Council, Taipei, Taiwan" to --Eastman Kodak Company, Rochester, New York--

Item [56]
Attorney, Agent or Firm : Should be corrected from "Madson & Metcalf" to --Peyton C. Watkins--.

Signed and Sealed this

Fifth Day of August, 1997

Attest:

*Attesting Officer*

BRUCE LEHMAN

*Commissioner of Patents and Trademarks*